United States Patent
Bianchini et al.

(10) Patent No.: US 10,678,603 B2
(45) Date of Patent: Jun. 9, 2020

(54) RESOURCE OVERSUBSCRIPTION BASED ON UTILIZATION PATTERNS IN COMPUTING SYSTEMS

(71) Applicant: Microsoft Technology Licensing, LLC, Redmond, WA (US)

(72) Inventors: Ricardo Bianchini, Bellevue, WA (US); William Clausen, Lawrence, KS (US); Marcus Fontoura, Clyde Hill, WA (US); Inigo Goiri, Bellevue, WA (US); Yunqi Zhang, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 721 days.

(21) Appl. No.: 15/254,994

(22) Filed: Sep. 1, 2016

(65) Prior Publication Data

US 2018/0060134 A1    Mar. 1, 2018

(51) Int. Cl.
*G06F 9/455*    (2018.01)
*G06F 9/50*    (2006.01)
*G06F 9/48*    (2006.01)

(52) U.S. Cl.
CPC ........ *G06F 9/5077* (2013.01); *G06F 9/45558* (2013.01); *G06F 9/4881* (2013.01); *G06F 9/5061* (2013.01); *G06F 9/5072* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS 7,290,259 B2 * 10/2007 Tanaka .................. G06F 9/5077
                                                                718/1
8,364,997 B2    1/2013 Tian et al.
(Continued)

FOREIGN PATENT DOCUMENTS

WO    2015027865 A1    3/2015
WO    2015177532 A1    11/2015

OTHER PUBLICATIONS

Ying "Sponge: An Oversubscription Strategy Supporting Performance Interference Management in Cloud", 2015 IEEE, pp. 196-209.*

(Continued)

*Primary Examiner* — Van H Nguyen
(74) *Attorney, Agent, or Firm* — Liang IP, PLLC

(57) ABSTRACT

Techniques of managing oversubscription of network resources are disclosed herein. In one embodiment, a method includes receiving resource utilization data of a virtual machine hosted on a server in a computing system. The virtual machine is configured to perform a task. The method also includes determining whether a temporal pattern of the resource utilization data associated with the virtual machine indicates one or more cycles of resource utilization as a function of time and in response to determining that the temporal pattern associated with the virtual machine indicates one or more cycles of resource utilization as a function of time, causing the virtual machine to migrate to another server that is not oversubscribed by virtual machines in the computing system.

20 Claims, 13 Drawing Sheets

(56) References Cited

U.S. PATENT DOCUMENTS

| | | | | |
|---|---|---|---|---|
| 8,631,099 | B2* | 1/2014 | Morgan | G06F 9/5088 709/203 |
| 8,671,407 | B2* | 3/2014 | Ballani | H04L 67/101 718/1 |
| 8,769,534 | B2 | 7/2014 | Liu | |
| 8,839,243 | B2* | 9/2014 | Baset | G06F 9/485 718/1 |
| 9,135,048 | B2* | 9/2015 | Klein | G06F 9/45558 |
| 9,454,408 | B2* | 9/2016 | Dutta | H04L 41/0823 |
| 9,519,500 | B2* | 12/2016 | Ballani | H04L 67/101 |
| 2002/0087611 | A1* | 7/2002 | Tanaka | G06F 9/5077 718/1 |
| 2004/0003077 | A1 | 1/2004 | Bantz et al. | |
| 2008/0034366 | A1* | 2/2008 | Tanaka | G06F 9/5077 718/1 |
| 2009/0007125 | A1 | 1/2009 | Barsness et al. | |
| 2010/0088205 | A1 | 4/2010 | Robertson | |
| 2012/0304191 | A1* | 11/2012 | Morgan | G06F 9/5088 718/105 |
| 2014/0082614 | A1* | 3/2014 | Klein | G06F 9/45558 718/1 |
| 2014/0173113 | A1 | 6/2014 | Vemuri et al. | |

OTHER PUBLICATIONS

Liu "A Consolidation Strategy Supporting Resources Oversubscription in Cloud Computing", 2016 IEEE, pp. 154-162.*

"International Search Report and Written Opinion Issued in PCT Application No. PCT/US2017/048788", dated Dec. 12, 2017, 11 Pages.

Householder, et al., "Simulating the Effects of Cloud-Based Oversubscription on Datacenter Revenues and Performance in Single and Multi-class Service Level", In Proceedings of IEEE 7th International Conference on Cloud Computing, Jun. 27, 2014, pp. 562-569.

Hu, et al., "Efficient Resources Provisioning Based on Load Forecasting in Cloud", In the Scientific World Journal, vol. 2014, Feb. 20, 2014, pp. 1-12.

Baset, et al., "Towards an understanding of oversubscription in cloud", In Proceedings of the 2nd USENIX conference on Hot Topics in Management of Internet, Cloud, and Enterprise Networks and Services, Apr. 24, 2014, pp. 1-27.

Jain, et al., "Topology-Aware VM Migration in Bandwidth Oversubscribed Datacenter Networks", In Proceedings of the 39th international colloquium conference on Automata, Languages, and Programming—vol. Part II, Jul. 9, 2012, pp. 1-36.

Williams, et al., "Overdriver: handling memory overload in an oversubscribed cloud", In Proceedings of the 7th ACM SIGPLAN/SIGOPS international conference on Virtual execution environments, Mar. 9, 2011, pp. 205-216.

Stage, et al., "Network-aware migration control and scheduling of differentiated virtual machine workloads", In Proceedings of the ICSE Workshop on Software Engineering Challenges of Cloud Computing, May 23, 2009, pp. 9-14.

Brebner, Paul, "Is your Cloud Elastic Enough? Performance Modeling the Elasticity of Infrastructure as a Service (IaaS) Cloud Applications", In Proceedings of the 3rd ACM/SPEC International Conference on Performance Engineering, Apr. 22, 2012, pp. 263-266.

Mishra, et al., "Towards characterizing cloud backend workloads: insights from Google compute clusters", In Newsletter ACM SIGMETRICS Performance Evaluation Review, vol. 37 Issue 4, Mar. 2010, pp. 34-41.

* cited by examiner

RESOURCE OVERSUBSCRIPTION BASED ON UTILIZATION PATTERNS IN COMPUTING SYSTEMS

BACKGROUND

Cloud computing systems typically include routers, switches, bridges, and other physical network devices that interconnect a large number of servers, network storage devices, and other types of computing devices. The individual servers can host one or more virtual machines or other types of virtualized components. The virtual machines can execute applications when performing desired tasks to provide cloud computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing typically utilizes virtual machines hosted on one or more servers to accommodate computation, communications, or other types of cloud service requests from users. For example, a server can host one or more virtual machines to provide web searching, website hosting, system updates, application development and testing, or other suitable computing services to users. The virtual machines can share computing, memory, network, storage, or other suitable types of resources of the hosting server.

When allocating virtual machines to individual servers, oversubscription is a technique for boosting resource utilization. When oversubscribed, a server can host a large number of virtual machines even though the server does not have enough physical resources to satisfy demands of all the virtual machines at the same time. For example, a server can have six physical processors or "cores." When oversubscribed, the server can host eight, ten, twelve or even more virtual machines each demanding one virtual core. Thus, the virtual machines can utilize the cores at different times to boost processor utilization on the server. However, when all of the virtual machines demand resources of the server at the same time, the server can suffer performance degradation, system failures, or other undesirable effects.

Several embodiments of the disclosed technology can mitigate the impact of the undesirable effects of oversubscription by categorizing virtual machines as performing user-facing or non-user-facing tasks and allocating virtual machines performing user-facing tasks to resources not oversubscribed. In certain embodiments, a task is user-facing when performance of the task involves user interactions. For example, a task of web searching is user-facing because web searching involves receiving a user input in order to generate search results. Tasks that do not involve synchronous user interaction can be categorized as non-user facing. For instance, batch data analytics (e.g., machine learning tasks), background maintenance tasks (e.g., system upgrades, virus scanning, disk defragmentation, etc.), and application development and testing are examples of non-user-facing tasks.

Several embodiments of the disclosed technology can support such categorization of tasks or associated virtual machines via signal processing of historical resource utilization data of the tasks, similar tasks, or tasks having the same task type or "role." For example, utilization data representing processor, memory, network, or storage utilization levels of individual virtual machines can be collected. Pattern analysis can then be performed on the collected utilization data to determine a temporal pattern present in the utilization data. In certain implementations, the temporal pattern can be classified as periodic, constant, or random patterns. A periodic pattern indicates a possibility that the corresponding task is user-facing, as users interact with the task during the day and sleep at night (or work during the day and interact with the task at night). In other implementations, the temporal pattern can be classified in other suitable manners.

In certain embodiments, performing pattern analysis can include applying Fast Fourier Transform to convert the utilization data from the time domain to the frequency domain. As such, a periodic pattern with one or more cycles can be detected in the transformed utilization data as one or more distinct spectral values greater than a threshold value. For example, if the utilization data indicates that a 75% CPU utilization is observed at 2:00 PM and a 15% CPU utilization is observed at 2:00 AM each day for a week, a distinct spectral value can be observed in the frequency domain as a large spectral value at a frequency of 7 times per week. In another example, a constant pattern can have spectral values less than a threshold for all frequencies and are all within a relatively narrow band. In yet another example, a random pattern does not have distinct high spectral values at certain frequencies. Instead, a random pattern can have high spectral values (e.g., maximum or above 95th percentile) at very low frequencies, for example, at or near zero frequency. In other embodiments, the pattern analysis can include applying Laplace, Fourier, or other suitable types of transforms.

When a task is categorized as user-facing, i.e., having a periodic pattern with a dominant frequency that is likely to result from user behavior (e.g., 7 cycles per week), the task can be allocated to a server that is not oversubscribed. On the other hand, when a task is categorized as non-user-facing, the task can be allocated to any server, which may be oversubscribed, undersubscribed, or fully subscribed. Thus, by allocating virtual machines for performing user-facing tasks to servers that are not oversubscribed, several embodiments of the disclosed technology can avoid or at least reduce risks of users experiencing service delays, interruptions, or other possible undesirable effects of oversubscription.

DETAILED DESCRIPTION

Figure 1:
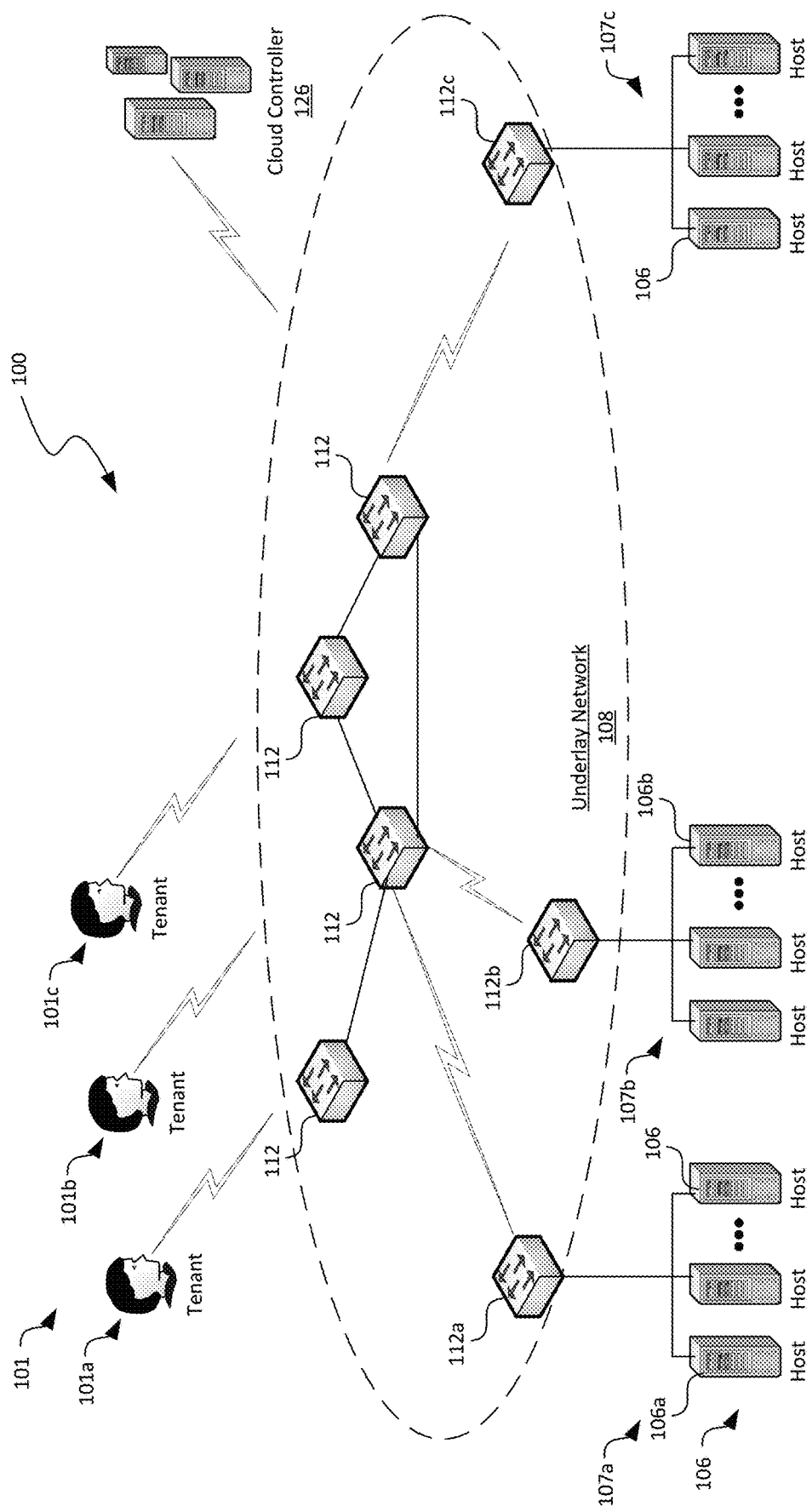
FIG. 1 is a schematic diagram illustrating a computing system implementing oversubscription of resources based on utilization patterns in accordance with embodiments of the disclosed technology.

Certain embodiments of systems, devices, components, modules, routines, data structures, and processes for managing oversubscription of resources in datacenters or other suitable computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-10.

As used herein, the term "computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "user facing" generally refers to a characteristic of computing tasks performance of which involves or depends on user interaction. For example, a task is user-facing when performance of the task involves receiving user input, confirmation, or other user actions, and providing a response for which the user is waiting. For example, a task of performing a web search is user-facing because the web search requires a query from a user in order to generate suitable search results. Tasks that do not involve user interaction can be categorized as non-user-facing. For instance, batch data analytics (e.g., machine learning tasks), background maintenance tasks (e.g., system upgrades, virus scanning, disk defragmentation, etc.), and application development and testing can be considered non-user-facing.

As used herein, the term "temporal pattern" generally refers to a pattern as a function of time related to, for instance, resource utilization of virtual machines or other suitable components of computing systems. In the descriptions below, temporal patterns are classified as periodic, constant, or random. A "periodic" pattern can include one or more distinct cycles as a function of time. A "constant" pattern can include a generally constant (e.g., within a threshold range) level of utilization as a function of time. A "random" pattern can include one without discernable trends or cycles. A periodic pattern suggests the possibility of a user-facing computation, as users are active during the day and inactive at night (or vice-versa). In other implementations, the temporal pattern can be classified in other suitable manners in addition to or in lieu of the foregoing patterns.

Oversubscription is a technique for boosting resource utilization in certain computing systems. For example, when oversubscribed, virtual machines can be allocated to a server having insufficient amount of physical resources to satisfy 100% of demand of the virtual machines at the same time. Thus, when all of the virtual machines utilize the resources of the server at the same time, the server can suffer performance degradations, system failures, or other undesirable effects. Such undesirable effects can negatively impact user experience of cloud computing services.

Several embodiments of the disclosed technology can dampen impact of such undesirable effects by categorizing tasks performed by virtual machines as user-facing or non-user-facing, and allocating performance of user-facing tasks to resources that are not oversubscribed. For example, when a task is categorized as user-facing, its virtual machine can be allocated to an undersubscribed server. On the other hand, when a task is categorized as non-user-facing, a virtual machine associated with the task can be allocated to any server, which may be oversubscribed, undersubscribed, or fully subscribed. Thus, by allocating resources for performing user-facing tasks on servers that are not oversubscribed, several embodiments of the disclosed technology can avoid or at least reduce the risk of users experiencing service delays, interruptions, or other possible undesirable effects of oversubscription, as described in more detail below with reference to FIGS. 1-9. Even though the disclosed technology is described below using the allocation of virtual machines as an example, at least certain aspects of the disclosed technology can also be applied for allocating memory (e.g., DRAMs), network (e.g., network bandwidths), storage (e.g., solid state devices or other suitable persistent storage), or other suitable types of resources in computing systems.

FIG. 1 is a schematic diagram illustrating a computing system 100 implementing oversubscription of resources based on utilization patterns in accordance with embodiments of the disclosed technology. As shown in FIG. 1, the computing system 100 can include an underlay network 108 interconnecting a plurality of hosts 106, a plurality of tenants 101, and a cloud controller 126. Even though particular components of the computing system 100 are shown in FIG. 1, in other embodiments, the computing system 100 can also include additional and/or different components. For example, the computing system 100 can also include network storage devices, maintenance managers, and/or other suitable components (not shown).

As shown in FIG. 1, the underlay network 108 can include one or more network nodes 112 that interconnect the multiple hosts 106, the tenants 101, and the cloud controller 126. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The computer network can allow communication between hosts 106, the cloud controller 126, and the tenants 101. In other embodiments, the multiple host sets 107a-107c may share a single network node 112 or can have other suitable arrangements.

The hosts 106 can individually be configured to provide computing, storage, and/or other suitable cloud computing services to the tenants 101. For example, as described in more detail below with reference to FIG. 2, one of the hosts 106 can initiate and maintain one or more virtual machines 144 (shown in FIG. 2) or containers 145 (shown in FIG. 3) upon requests from the tenants 101. The tenants 101 can then utilize the initiated virtual machines 144 or containers 145 to perform computation, communication, and/or other suitable tasks. In certain embodiments, one of the hosts 106 can provide virtual machines 144 for multiple tenants 101. For example, the host 106a can host three virtual machines 144 individually corresponding to each of the tenants 101a-101c. In other embodiments, multiple hosts 106 can host virtual machines 144 for the tenants 101a-101c.

In accordance with several embodiments of the disclosed technology, the cloud controller 126 can be configured to allocate virtual machines 144 (or other suitable resources) in the computing system 100 based on utilization patterns of such virtual machines 144. In certain embodiments, the cloud controller 126 can allocate virtual machines 144 configured to perform user facing tasks to one or more hosts 106 that are not oversubscribed. The cloud controller 126 can also allocate virtual machines 144 configured to perform non-user facing tasks to hosts 106 that are oversubscribed. In other embodiments, non-user facing tasks can be allocated to any hosts 106 irrespective of whether the hosts 106 are oversubscribed. In certain implementations, the cloud controller 126 can be a datacenter controller, a fabric controller, or other suitable types of controller or a component thereof. In other implementations, the cloud controller 126 can be an independent hardware/software component of the computing system 100.

In certain embodiments, the cloud controller 126 can be configured to determine whether a task associated with requested resources is user-facing by analyzing historical utilization data associated with a corresponding virtual machine 144. If the utilization data has a periodic temporal pattern, the cloud controller 126 can indicate that the task is user-facing. If the utilization data has a constant or random temporal pattern, the cloud controller 126 can indicate that the task is non-user-facing. In other embodiments, the foregoing pattern analysis can be performed by one of the hosts 106, a dedicated server (not shown), or other suitable entities in the computing system 100 in addition to or in lieu of the cloud controller 126. Example components of the cloud controller 126 for performing the foregoing functions are described in more detail below with reference to FIGS. 3-4C.

Figure 2:
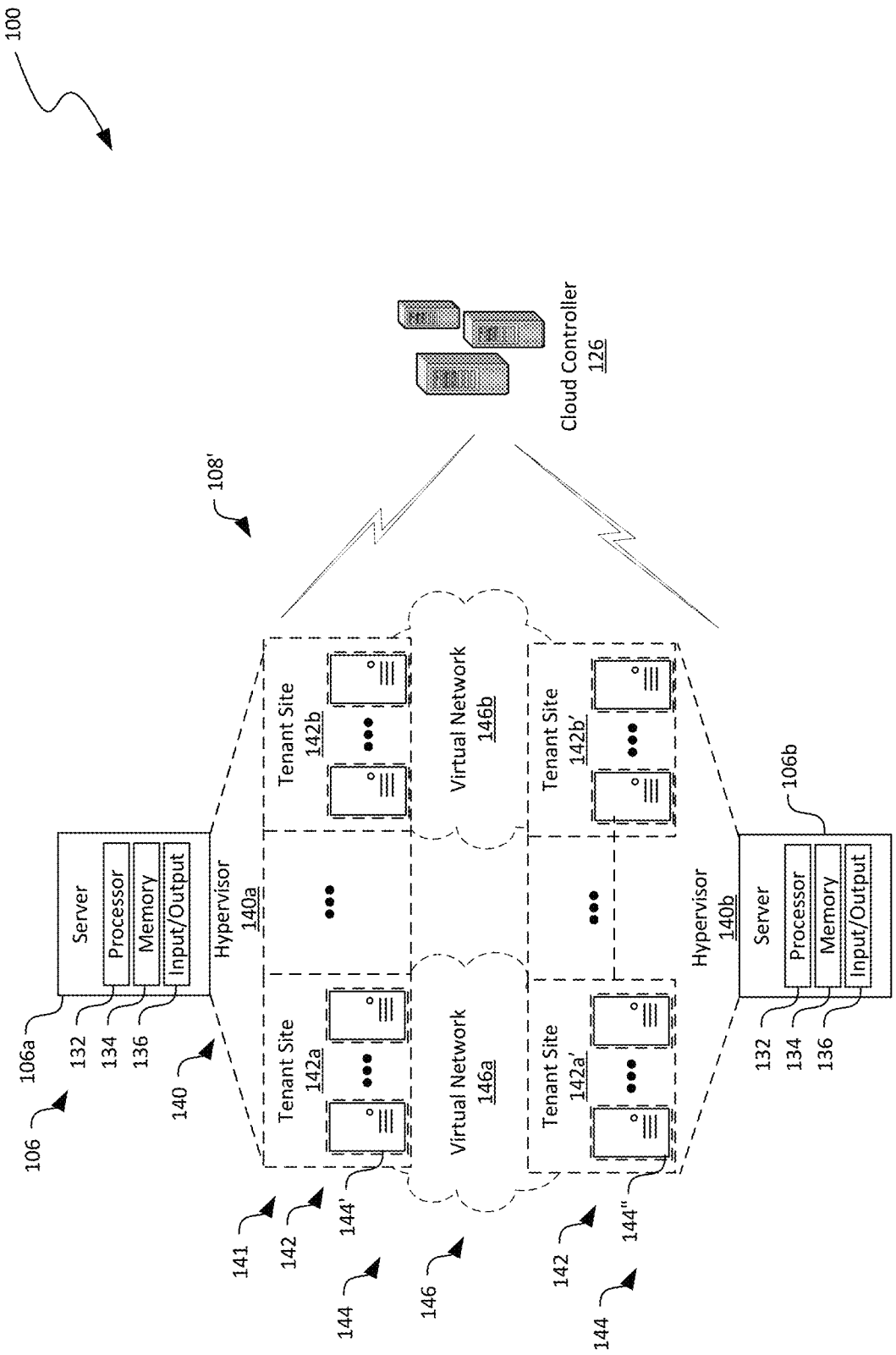
FIG. 2 is a schematic diagram illustrating certain hardware/software components of the computing system of FIG. 1 in accordance with embodiments of the disclosed technology.

FIG. 2 is a schematic diagram illustrating an overlay network 108' implemented on the underlay network 108 of FIG. 1 in accordance with embodiments of the disclosed technology. In FIG. 2, only certain components of the underlay network 108 of FIG. 1 are shown for clarity. As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5C and 9). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 executable by the processors 132, cause the individual processors 132 to provide a hypervisor 140 (identified individually as first and second hypervisors 140a and 140b) and a status agent 141 (identified individually as first and second status agent 141a and 141b). Even though the hypervisor 140 and the status agent 141 are shown as separate components, in other embodiments, the status agent 141 can be a part of the hypervisor 140 or an operating system (not shown) executing on the corresponding host 106. In further embodiments, the status agent 141 can be a standalone application.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 3:
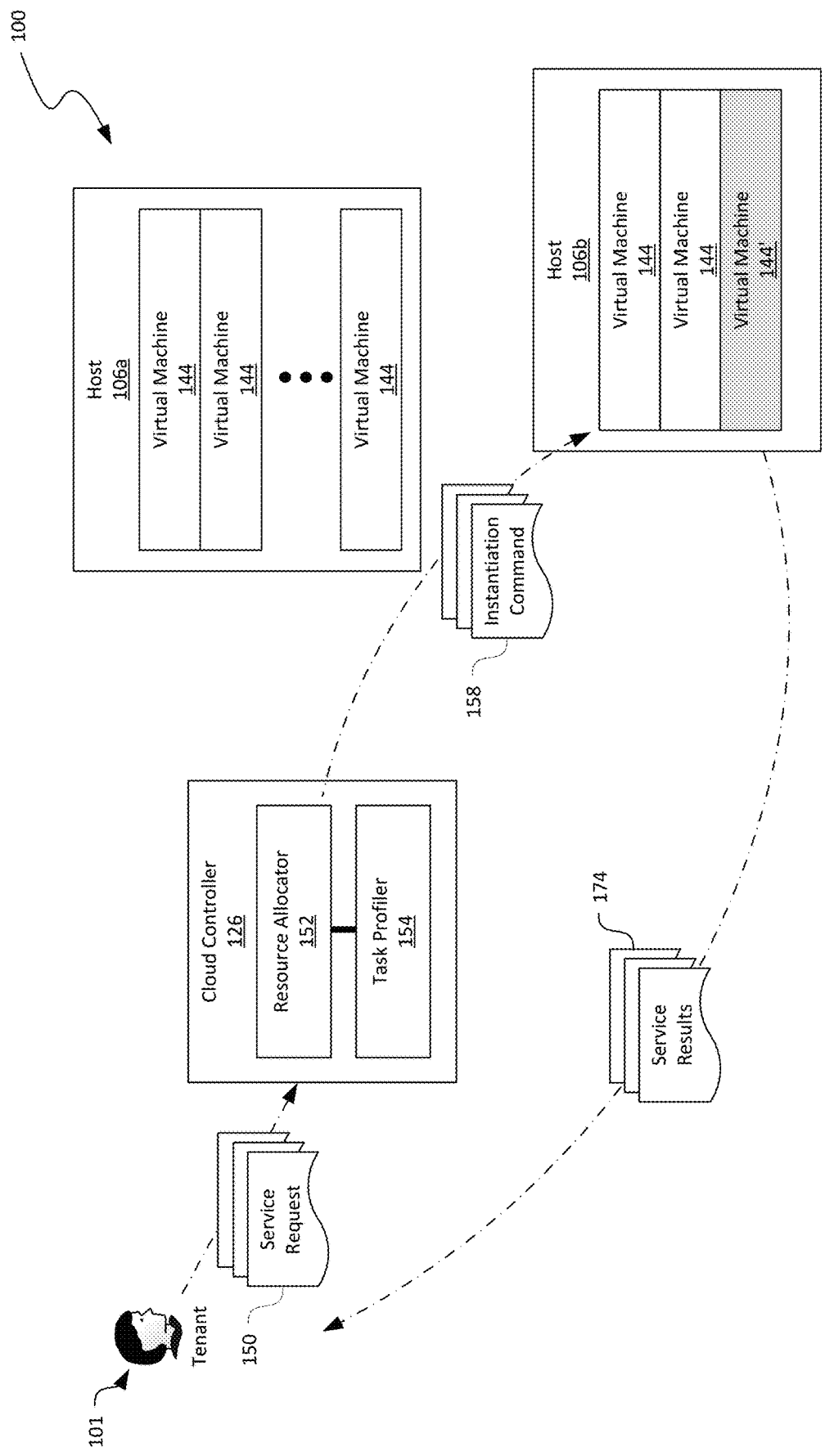
FIG. 3 is a block diagram illustrating hardware/software components of a cloud controller suitable for the computing system of FIG. 1 in accordance with embodiments of the disclosed technology.

FIG. 3 is a block diagram illustrating certain hardware/software components of a cloud controller 126 suitable for the computing system 100 shown in FIGS. 1 and 2 in accordance with embodiments of the disclosed technology. In FIG. 3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software.

Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the first and second hosts 106a and 106b can be configured to host one or more virtual machines 144, for example, via a hypervisor 140 (FIG. 2). In the illustrated example in FIG. 3, the first host 106a can be oversubscribed by hosting a number of virtual machines 144 demand from which exceeds the physical resources available at the first host 106a. As such, the first host 106a may not satisfy 100% of the demand from the hosted virtual machines 144 at the same time. On the other hand, the second host 106b can be undersubscribed by hosting a smaller number of virtual machines 144 than the first host 106a. Operations of the cloud controller 126 are described below with the foregoing illustrative examples. In other embodiments, the computing system 100 can include additional hosts 106 that are oversubscribed, undersubscribed, or fully subscribed.

As shown in FIG. 3, the cloud controller 126 can include a resource allocator 152 and a task profiler 154 operatively coupled to one another. The resource allocator 152 can be configured to allocate processing, memory, network, storage, or other suitable types of resources to a task for providing a cloud computing service requested by the tenant 101. In one embodiment, the resource allocator 152 can include a virtual machine allocator configured to allocate a virtual machine to a physical host 106 (FIG. 1). In other embodiments, the resource allocator 152 can include memory, network, storage, or other suitable types of allocator. Even though FIG. 3 shows that the resource allocator 152 and the task profiler 154 are integral parts of the cloud controller 126, in other embodiments, the foregoing components can be can be provided by distinct components of the computing system 100. For example, the task profiler 154 can be an independent application hosted on one or more of the hosts 106 (FIG. 1) while the resource allocator 152 is a part of a datacenter controller, fabric controller, or other suitable types of controller.

The task profiler 154 can be configured to determine and provide the temporal pattern of utilization based on historical utilization data of the tasks, similar tasks, or tasks having the same task type or "role." For example, the task profiler 154 can initially allocate the virtual machine 144' to a default host 106 (e.g., the second host 106b) and collect utilization data over a week, month, or other suitable periods of time. The task profiler 154 can then analyze the collected utilization data to determine a temporal pattern associated with the task performed by the virtual machine 144'. In another example, the task profiler 154 can classify the task with a certain type or role, for instance, web services, development and testing, etc., and determine a temporal pattern using utilization data of tasks classified similarly as the requested task. In yet further examples, the task profiler 154 can be configured to determine the temporal pattern associated with the task in other suitable manners, examples of which are described below with reference to FIGS. 4A-4C.

In operation, the tenant 101 can transmit a service request 150 to the computing system 100 for instantiating a virtual machine 144' for executing a desired task. In response to the received service request 150, the cloud controller 126 can allocate the virtual machine 144' based on, inter alia, a temporal pattern of utilization associated with the virtual machine 144' configured to execute the task. In the illustrated embodiment, the task profiler 154 can provide a determined temporal pattern associated with the task and indicate that the task is user-facing. In response, the resource allocator 152 can allocate the virtual machine 144' to the second host 106b, which is not oversubscribed. The cloud controller 126 or other suitable entities in the computing system 100 can then transmit an instantiation command 158 to provision for and instantiate the virtual machine 144'. Once instantiated, the virtual machine 144' can execute suitable instructions to provide service results 174 to the tenant 101. In other embodiments, the task profiler 154 can indicate that the task is not user-facing. As such, the cloud controller 126 can allocate the virtual machine 144' to the first host 106a or other suitable hosts 106 (FIG. 1).

Figure 4A:
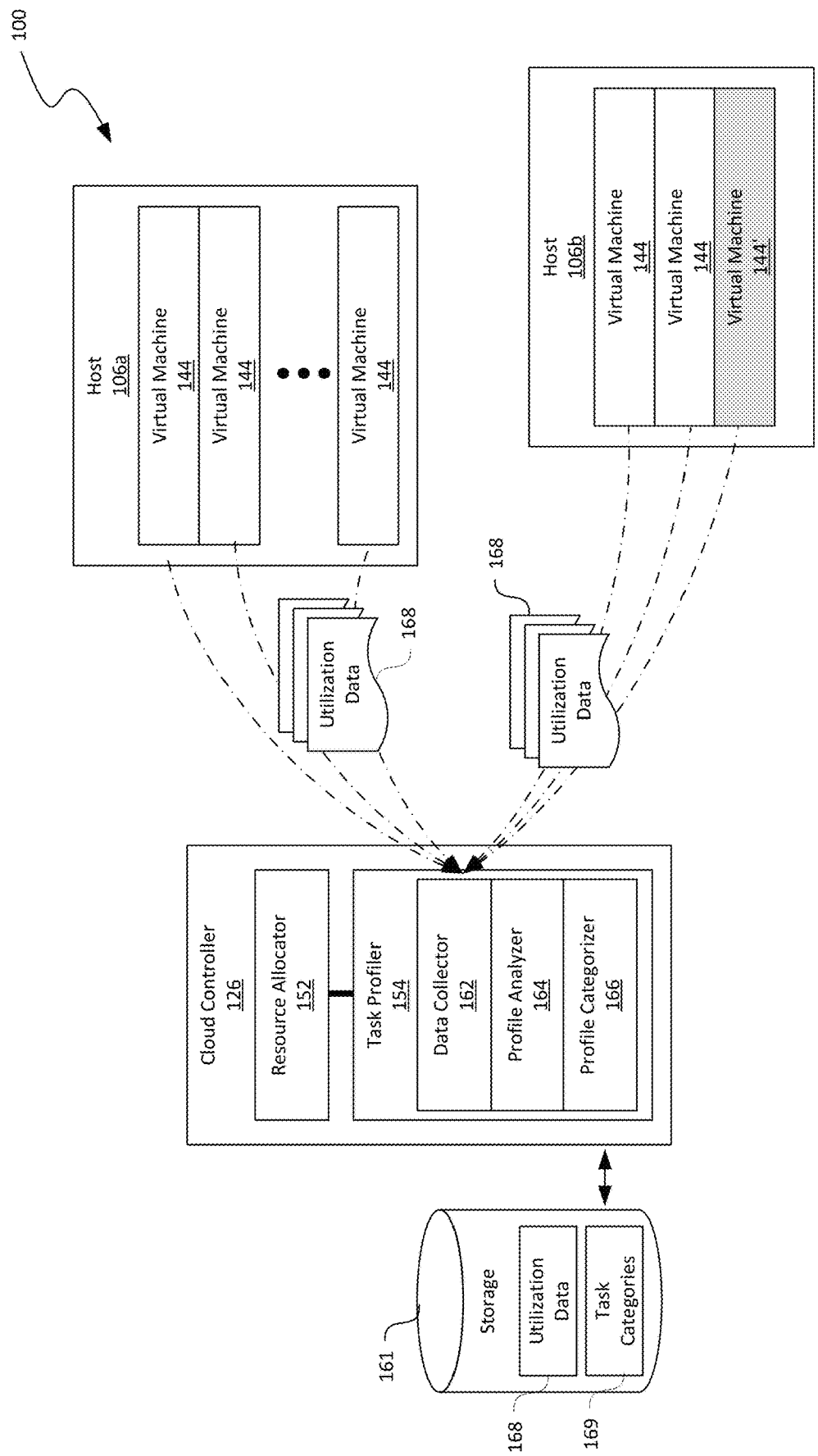
FIGS. 4A-4C are block diagrams of the cloud controller in FIG. 3 during certain stages of categorizing tasks performed by virtual machines in the computing system of FIG. 1 in accordance with embodiments of the disclosed technology.
Figure 4B:
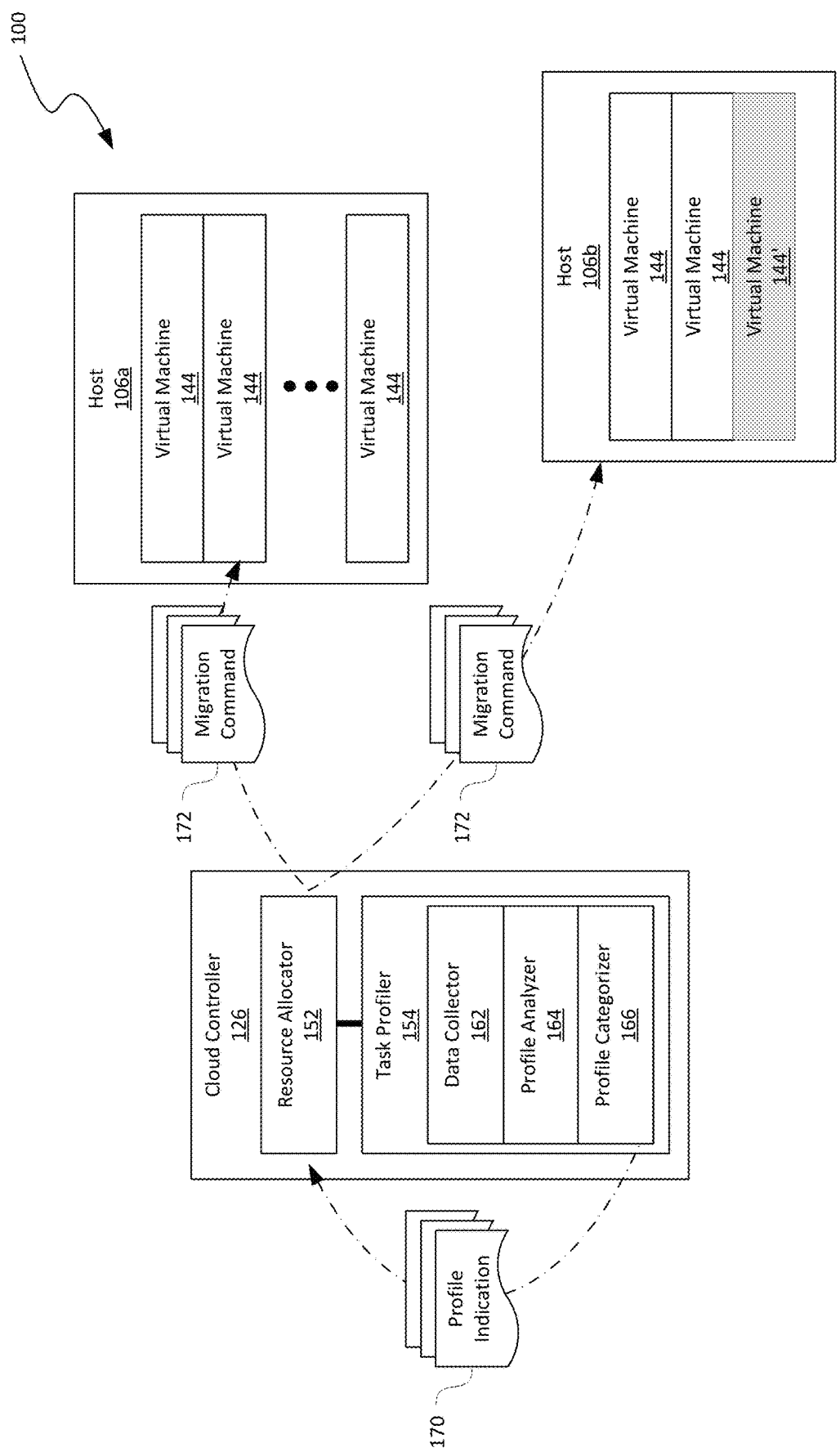
Figure 4C:
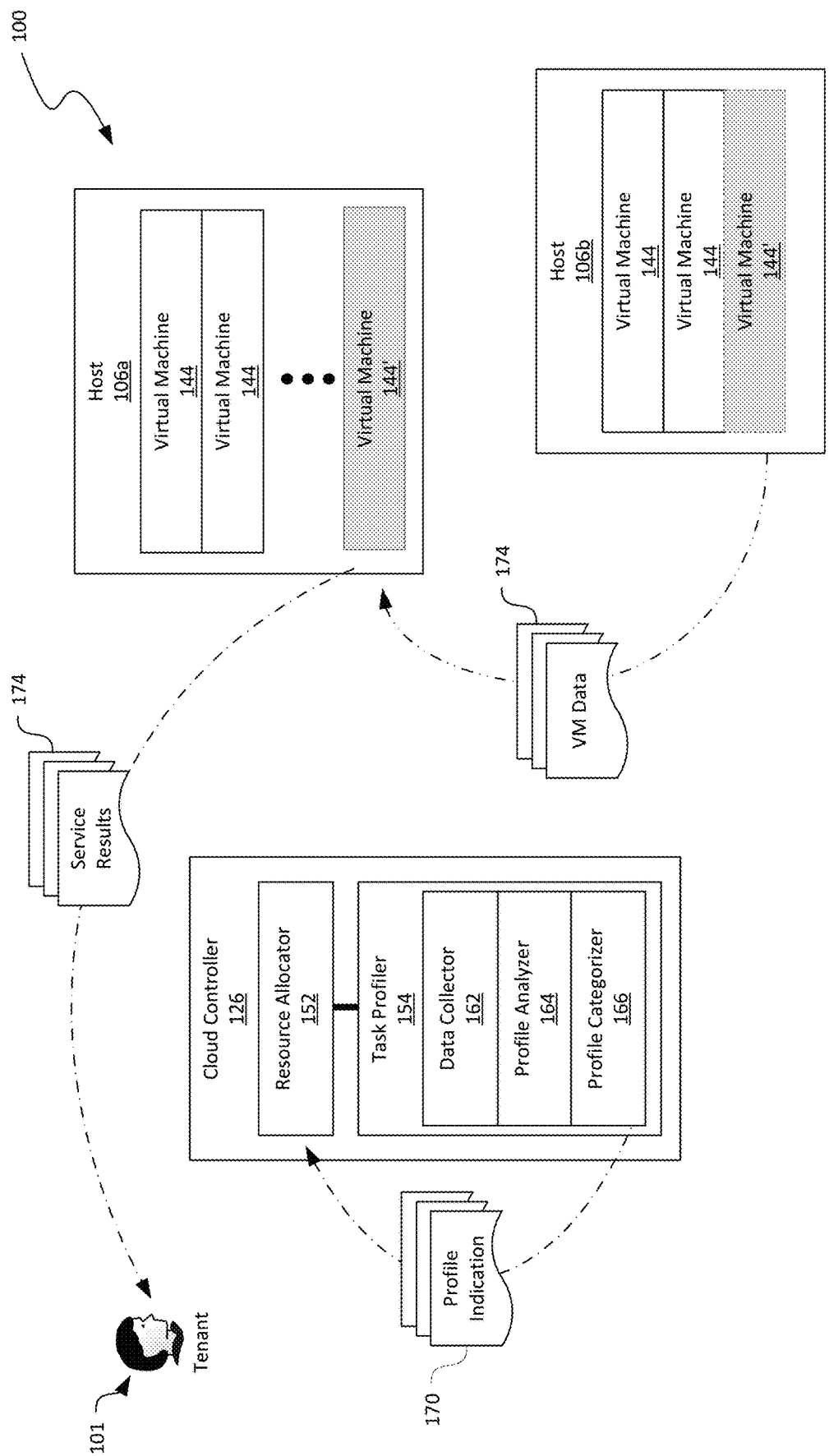

FIGS. 4A-4C are block diagrams of the cloud controller 126 in FIG. 3 during certain stages of categorizing tasks performed by the task profiler 154 FIG. 3 in accordance with embodiments of the disclosed technology. As shown in FIG. 4A, the cloud controller 126 can be operatively coupled to a storage 161. In one embodiment, the storage 161 can be a network storage in the computing system 100. In another embodiment, the storage 161 can be a dedicated storage device coupled to the cloud controller 126. In further embodiments, the storage 161 can be an integral part of the cloud controller 126.

Also shown in FIG. 4A, the task profiler 154 can include a data collector 162, a profile analyzer 164, and a profile categorizer 166 operatively coupled to one another. Even though particular components of the task profiler 154 are shown in FIGS. 4A-4C, in other embodiments, the task profiler 154 can also include input/output interfaces and/or other suitable components.

The data collector 162 can be configured to collect utilization data 168 from the virtual machines 144 hosted on the first and second hosts 106a and 106b. In certain embodiments, the data collector 162 can query the first and second hosts 106a and 106b regarding utilization of CPU, volatile memory, network bandwidth, non-volatile storage, or other suitable types of utilization data 168 for individual virtual machines 144 on each of the first and second hosts 106a and 106b. The data collector 162 can query the first and second hosts 106a and 106b periodically or in other suitable manners. In other embodiments, the first and second hosts 106a and 106b can each include a reporting agent (not shown) configured to report the utilization data 168 to the data collector 162 periodically or in other suitable manners. The reporting agent can be a part of the operating system, hypervisor, or other suitable component on the first and second hosts 106a and 106b. In further embodiments, the data collector 162 can implement a combination of the foregoing data retrieving techniques. The data collector 162 can then provide the received utilization data 168 to the profile analyzer 164 for further processing and optionally store the utilization data 168 in a storage 161.

The profile analyzer 164 can be configured to analyze the utilization data 168 for a temporal pattern of the utilization data 168. In one embodiment, the profile analyzer 164 can be configured to plot the utilization data 168 of a virtual machine 144 as a function of time. The profile analyzer 164 can then determine a temporal profile of the utilization data 168 based on the plot. For example, the profile analyzer 164 can determine that the temporal profile has a constant pattern when a distribution of the utilization values is within a narrow band. In another example, the profile analyzer 164 can also determine that the temporal profile has a random pattern when a distribution profile (e.g., a standard deviation) of the utilization values is approaching that of white noise.

In other embodiments, the profile analyzer 164 can also be configured to apply a Fast Fourier Transform to convert the utilization data 168 from the time domain to a spectrum in the frequency domain. Based on the spectrum profile, the profile analyzer 164 can then determine a temporal profile of the utilization data 168. For example, when the spectrum shows one or more distinct spectral values greater than a threshold at corresponding frequencies, the profile analyzer 164 can indicate that the utilization data 168 has a periodic pattern. In another example, when the spectrum shows spectral values lower than another threshold for all frequencies, the profile analyzer 164 can indicate that the utilization data 168 has a constant pattern. In a further example, when the spectrum shows highest spectral values at or near zero frequency, the profile analyzer 164 can indicate that the utilization data 168 has a random pattern. Example plots of utilization data 168 in both time and frequency domain are described in more detail below with reference to FIGS. 6A-8B.

The profile categorizer 166 can then be configured to categorize the tasks performed by the various virtual machines 144 as one of user-facing or non-user-facing based on the temporal profiles. For example, in one embodiment, the profile categorizer 166 can categorize tasks with periodic patterns as user-facing. In another embodiment, the profile categorizer 166 can categorize tasks with random and constant patterns as non-user-facing. In further examples, the profile categorizer 166 can categorize the tasks based on other utilization measures or other suitable criteria in other suitable ways. In the illustrated embodiment, the profile categorizer 166 can also be configured to store the categorized tasks as task categories 169 in the storage 161 along with a task identification (e.g., a task sequence number), a task type (e.g., web search), a task role (e.g., data retrieval), or other suitable characteristics associated with the tasks.

In the illustrated embodiment in FIG. 4A, the virtual machine 144' can be initially hosted on the second host 106b because the profile categorizer 166 has categorized a similar task as user-facing, the task to be performed by the virtual machine 144' has no corresponding record of task categories 169 in the storage 161, or for other suitable reasons. Once the virtual machine 144' is instantiated and executing the requested task, the data collector 162 can collect corresponding utilization data 168 and categorize the task performed by the virtual machine 144' as described above.

As shown in FIG. 4B, if the profile categorizer 166 categorize the task performed by the virtual machine 144' as non-user-facing, the task profiler 154 can inform the resource allocator 152 accordingly via a profile indication 170. In certain embodiments, the resource allocator 152 can issue a migration command 172 to the first and/or second host 106a and 106b to migrate the virtual machine 144' from the second host 106b to the first host 106a, which is oversubscribed. As shown in FIG. 4C, during migration, the second host 106b can transmit virtual machine data 174 associated with the virtual machine 144' to the first host 106a. Once migrated, the virtual machine 144' can execute the task on the first host 106a and provide the service results 174 to the tenant 101. In other embodiments, the resource allocator 152 can leave the virtual machine 144' at the second host 106b and only relocate the virtual machine 144' in response to a request for virtual machine update or other suitable operations.

In further embodiments, if the profile categorizer 166 categorize the task performed by the virtual machine 144' as user facing, the resource allocator 152 can check whether the virtual machine 144' is currently hosted on a host 106 that is not oversubscribed. In the illustrated embodiment in FIG. 4B, the second host 106b is not oversubscribed, and thus the resource allocator 152 can keep the virtual machine 144' on the second host 106b. On the other hand, if the virtual machine 144' was initially hosted on the first host 106a (not shown), the resource allocator 152 can then issue appropriate commands to migrate the virtual machine 144' from the first host 106a to another host 106, such as the second host 106b, which is not oversubscribed.

Figure 5A:
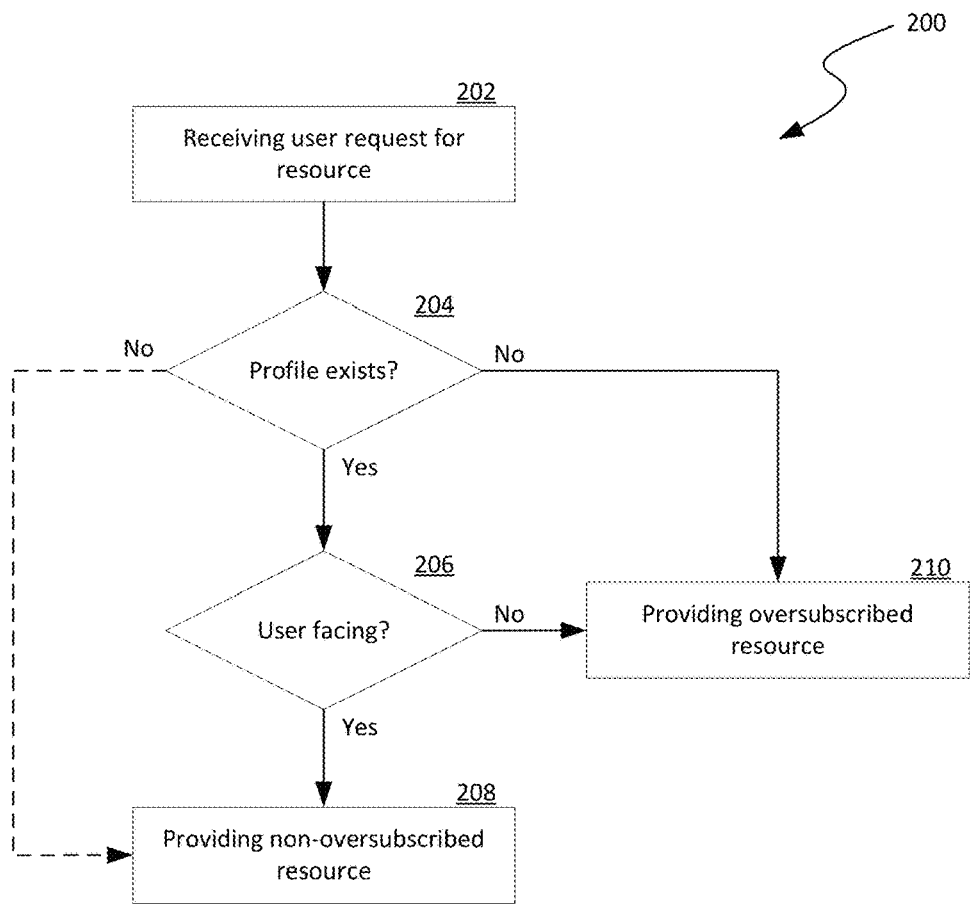
FIGS. 5A-5C are flowcharts illustrating processes of managing oversubscription of resources in a computing system in accordance with embodiments of the disclosed technology.

FIG. 5A is a flowchart illustrating a process 200 of managing oversubscription of resources in a computing system in accordance with embodiments of the disclosed technology. Even though the process 200 is described in relation to the computing system 100 of FIGS. 1 and 2 and the hardware/software components of FIGS. 3-4C, in other embodiments, the process 200 can also be implemented in other suitable systems.

As shown in FIG. 5A, the process 200 includes receiving a user request for resources at stage 202. In certain embodiments, the requested resources can include virtual machines configured to perform a target task. In other embodiments, the requested resources can include memory, network, storage, or other suitable types of computing resources for performing the target task in a datacenter or other suitable types of computing system. The process 200 can then include a decision stage 204 to determine whether a utilization profile exists for the target task to be performed by the requested resources. In one embodiment, the utilization profile can include one associated with another task of a similar type or role as the target task. In other embodiments, the utilization profile can include one associated with past performance of the same target task.

In response to determining that a utilization profile does exist for the target task, the process 200 can then include another decision stage 206 to determine whether the target task is user-facing. In response to determining that the target task is user-facing, the process 200 can include providing resources that are not oversubscribed in response to the received user request at stage 208. On the other hand, in response to determining that the target task is non-user-facing, the process 200 can include providing oversubscribed resources in response to the received user request at stage 210. In response to determining that a utilization profile does not exist, the process 200 can proceed directly to either providing oversubscribed resources or non-oversubscribed resources at stage 210 and 208, respectively.

Figure 5B:
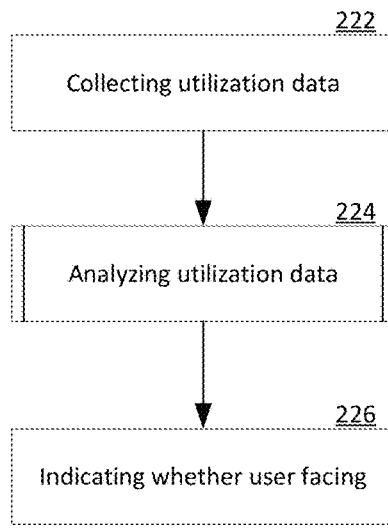

FIG. 5B is a flowchart illustrating a process 220 of categorizing tasks performed in a computing system in accordance with embodiments of the disclosed technology. As shown in FIG. 5B, the process 220 can include collecting utilization data from individual servers, storage devices, or other suitable components of a computing system at stage 222. For example, in one embodiment, the utilization data can include CPU utilization levels of various virtual machines on a single server. In another example, the utilization data can include virtual storage usage of various virtual machines hosted on a server. In further examples, the utilization data can include other suitable data reflecting usage of memory, network bandwidth, or other suitable resources in a computing system.

The process 220 can then include analyzing the collected utilization data at stage 224. In certain embodiments, analyzing the collected utilization data can include converting the utilization data in the time domain to a spectrum in the frequency domain. Based on a spectrum profile of the utilization data in the frequency domain, different patterns can be determined. For example, a periodic pattern involves one or more distinct spectral values greater than a threshold at corresponding frequencies. A constant pattern involves spectral values lower than another threshold at generally all frequencies. A random pattern involves spectral values with highest values at or near zero frequency. Example operations for analyzing the utilization data are described in more detail below with reference to FIG. 5C.

The process 220 can then include indicating whether the task is user facing based on the various determined patterns. For example, if a periodic pattern is determined, the process 220 can indicate that the corresponding task is user facing because users typically utilize computing resources periodically, for instance, during daytime, but not at night. If a constant or random pattern is determined, the process 220 can indicate that the task is not user facing because no discernable pattern of utilization can be observed.

Figure 5C:
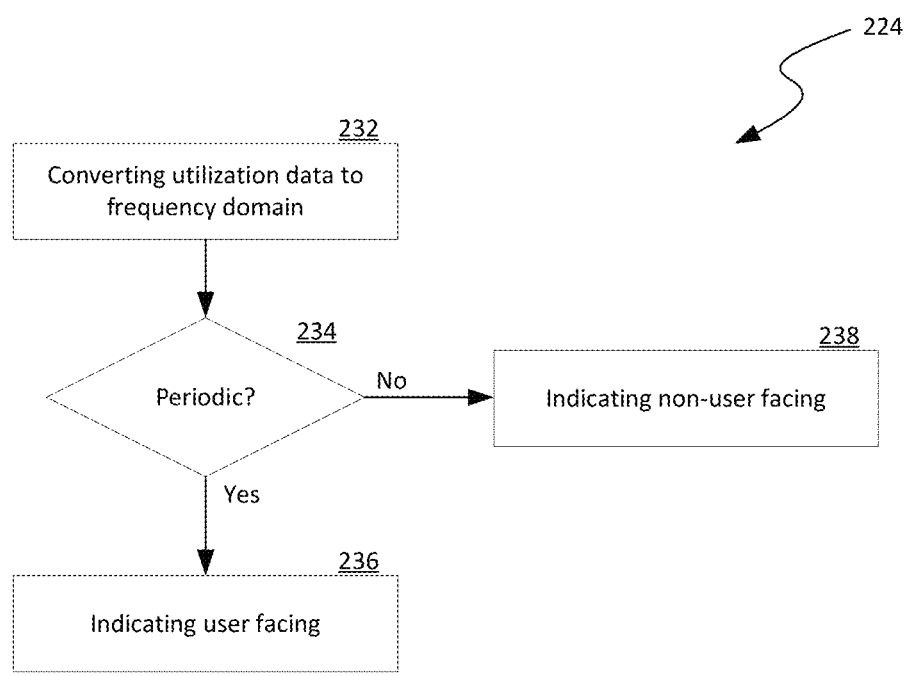

FIG. 5C shows example operations for analyzing the utilization data in accordance with embodiments of the disclosed technology. As shown in FIG. 5C, the operations can include converting utilization data from the time domain to a spectrum in the frequency domain at stage 232. One technique suitable for such a conversion is a Fast Fourier Transform which computes a discrete Fourier transform of a sequence of values. In other embodiments, a Laplace transform or regular Fourier transform can also be applied.

The operations can also include a decision stage 234 to determine whether the spectrum indicates a periodic pattern. In one embodiment, the spectrum indicates a periodic pattern when one or more distinct spectral values greater than a threshold at corresponding frequencies, as shown in FIG. 6B. In other embodiments, the spectrum can be categorized based on a distribution of spectral values or other suitable techniques. In response to determining that the spectrum indicates a periodic pattern, the operations can include indicating that the task is user-facing at stage 236. In response to determining that the spectrum does not indicate a periodic pattern, the operations can include indicating that the task is non-user-facing at stage 238. Further example operations of determining a temporal profile of utilization data are described in more detail below with reference to FIGS. 6A-9.

Figure 6A:
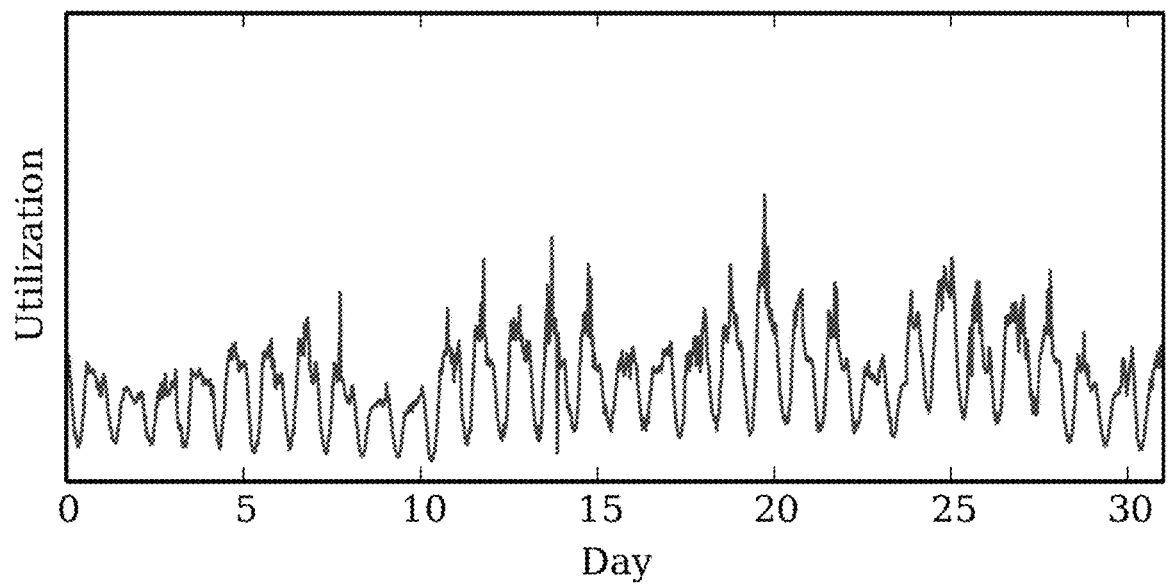
FIGS. 6A and 6B are example utilization versus time plot and corresponding frequency spectrum, respectively, for a task characterized as periodic utilization in accordance with embodiments of the disclosed technology.
Figure 6B:
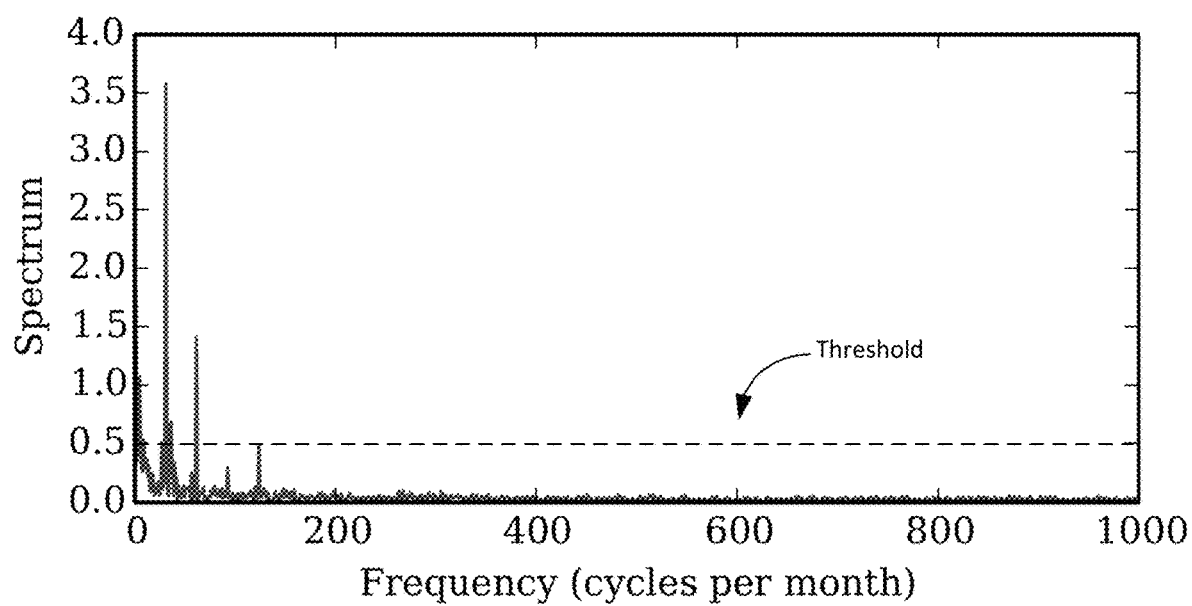

FIG. 6A shows an example utilization data plot in the time domain, and FIG. 6B shows the same utilization data converted into the frequency domain of an example periodic pattern. As shown in FIG. 6A, the utilization data shows a repeating pattern from one day to another. As shown in FIG. 6B, the spectrum includes one or more spectral values (e.g., about 3.5 and 1.4) that are greater than a periodic threshold (e.g., set at 0.5). In one embodiment, the periodic threshold can be set to a spectral value that is an average (or multiple thereof) of all the spectral values. In other embodiments, the periodic threshold can be set as a medium value, a suitable percentile value (e.g., at 75th percentile), or other suitable values.

Figure 7A:
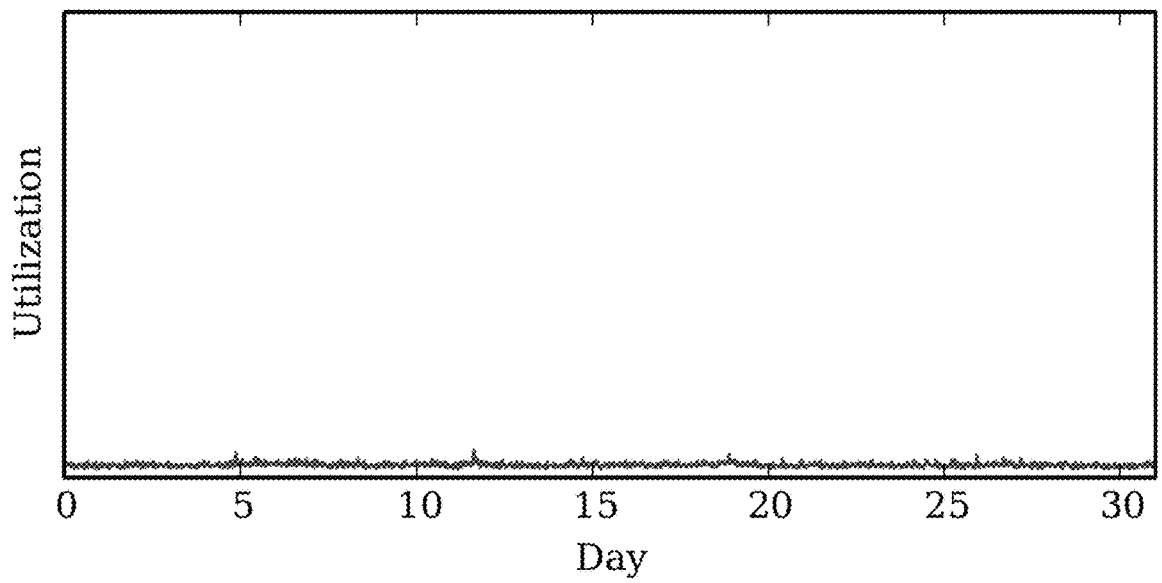
FIGS. 7A and 7B are example utilization versus time plot and corresponding frequency spectrum, respectively, for a task characterized as constant utilization in accordance with embodiments of the disclosed technology.
Figure 7B:
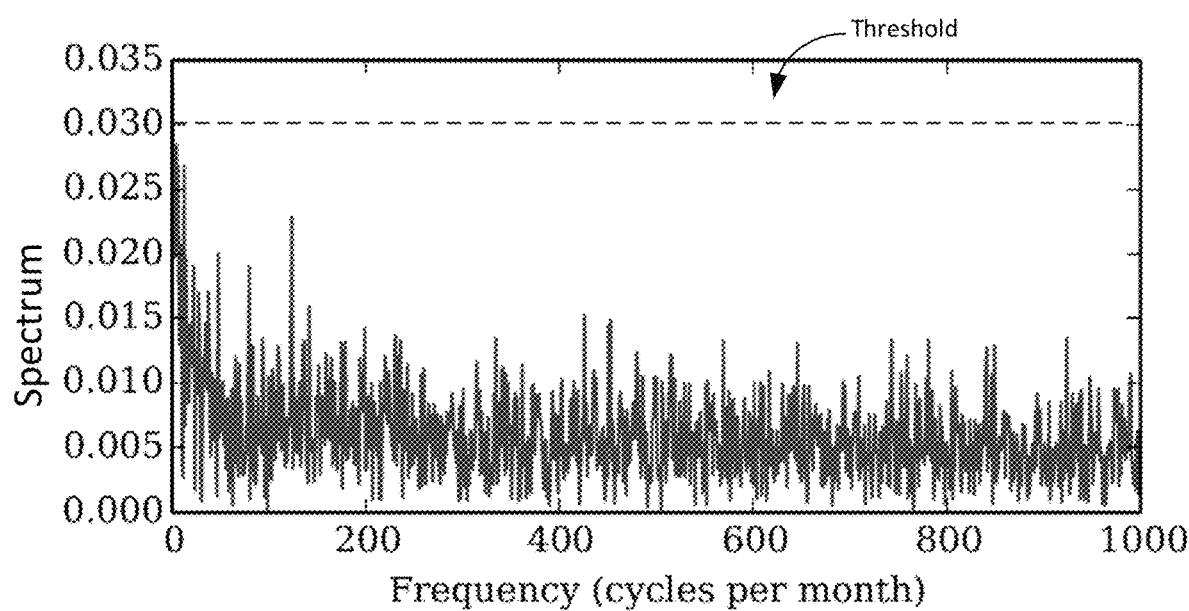

FIG. 7A shows an example utilization data plot in the time domain, and FIG. 7B shows the same utilization data converted into the frequency domain of an example constant pattern. As shown in FIG. 7A, the utilization data has a generally constant trend with small variations with respect to time. As shown in FIG. 7B, the spectrum has spectral values between 0.000 to about 0.025 all lower than a constant threshold (e.g., 0.030) for all frequencies. The constant threshold can be set to have a value significantly lower than an expected spectral value of a periodic pattern. For instance, in the example shown in FIG. 6B, the constant threshold can be set at, for example, at 0.05, which is significantly lower than the spectral values of 3.5 and 1.5. In other embodiments, the constant threshold can be set in other suitable manners.

Figure 8A:
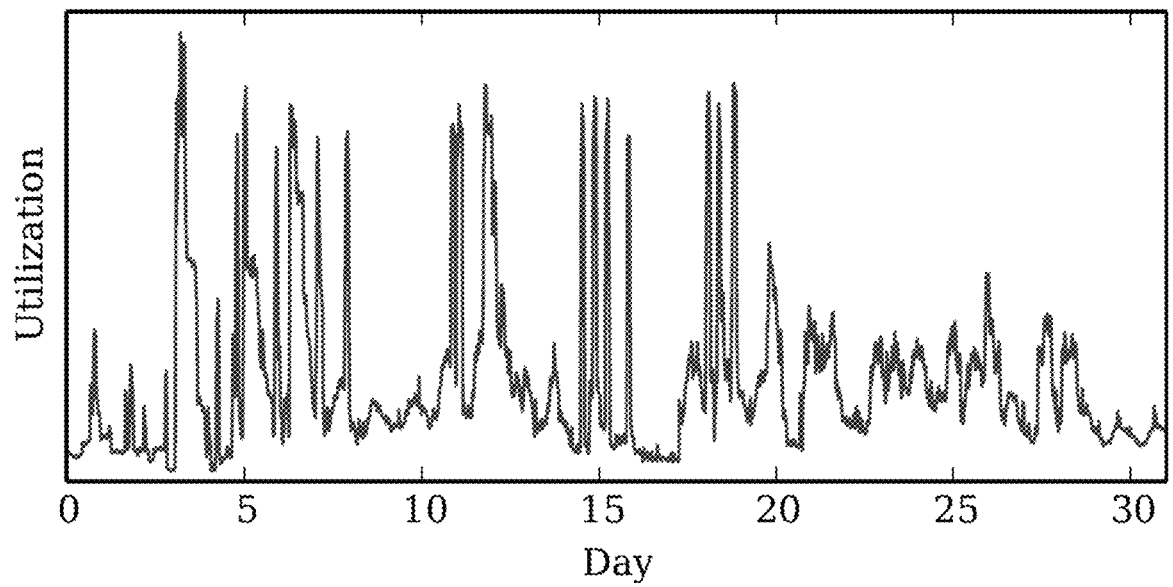
FIGS. 8A and 8B are example utilization versus time plot and corresponding frequency spectrum, respectively, for a task characterized as unpredictable utilization in accordance with embodiments of the disclosed technology.
Figure 8B:
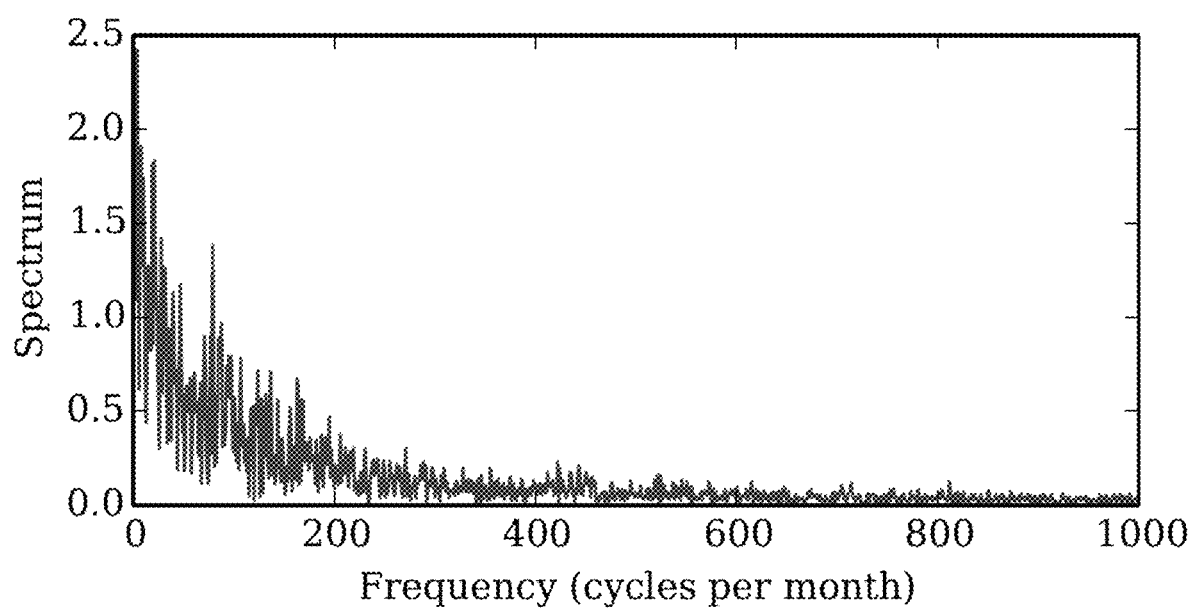

FIG. 8A shows an example utilization data plot in the time domain, and FIG. 8B shows the same utilization data converted into the frequency domain of an example random pattern. As shown in FIG. 8A, the utilization data can have irregular repeating patterns as a function of time. As shown in FIG. 8B, the spectrum can have highest spectral values (e.g., 2.5) at or near zero frequency.

Figure 9:
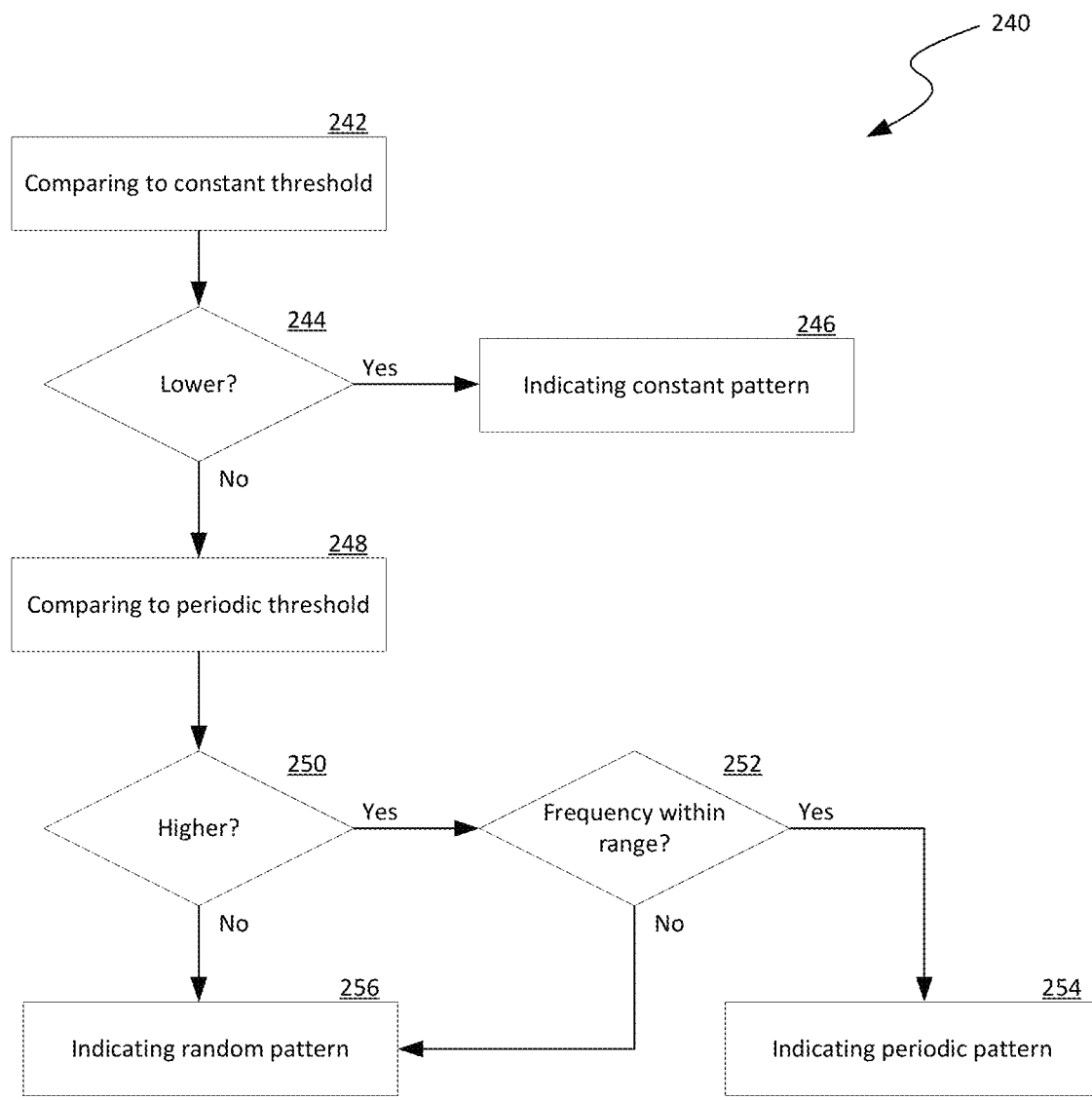
FIG. 9 is a flowchart showing a process for determining a temporal pattern of utilization data in accordance with embodiments of the disclosed technology.

FIG. 9 is a flowchart showing an example process 240 for determining a temporal pattern of utilization data. As shown in FIG. 9, the process 240 can include initially determining whether a spectrum of the utilization data has all spectral values lower than a constant threshold, for example, the threshold of 0.03 in FIG. 7B. If all spectral values are lower than a constant threshold, the process 240 can indicate that the utilization data has a constant pattern at stage 245. Otherwise, the process 240 proceeds to comparing the spectral values to a periodic threshold, for example, the threshold of 0.5 shown in FIG. 6B. In response to determining that the spectral values to a periodic threshold, the process 240 can proceed to another decision stage to determine whether frequencies corresponding to the spectral values higher than the periodic threshold is within a frequency range (e.g., from about 31 to about 93 cycles per month). This range seeks to ascertain whether the periodicity is possibly due to user interaction or not. For example, a pattern that shows 7 cycles during a week is likely a result of user interaction, whereas one showing 1000 cycles is not. In response to determining that the frequencies corresponding to the spectral values higher than the periodic threshold are within the frequency range, the process 240 can include indicating that the utilization data has a periodic pattern at stage 254. In response to determining that the frequencies corresponding to the spectral values higher than the periodic threshold are not within a frequency range or in response to determining that the spectral values are not greater than the periodic threshold, the process 240 can proceed to indicating that the utilization data has a random pattern at stage 256.

Figure 10:
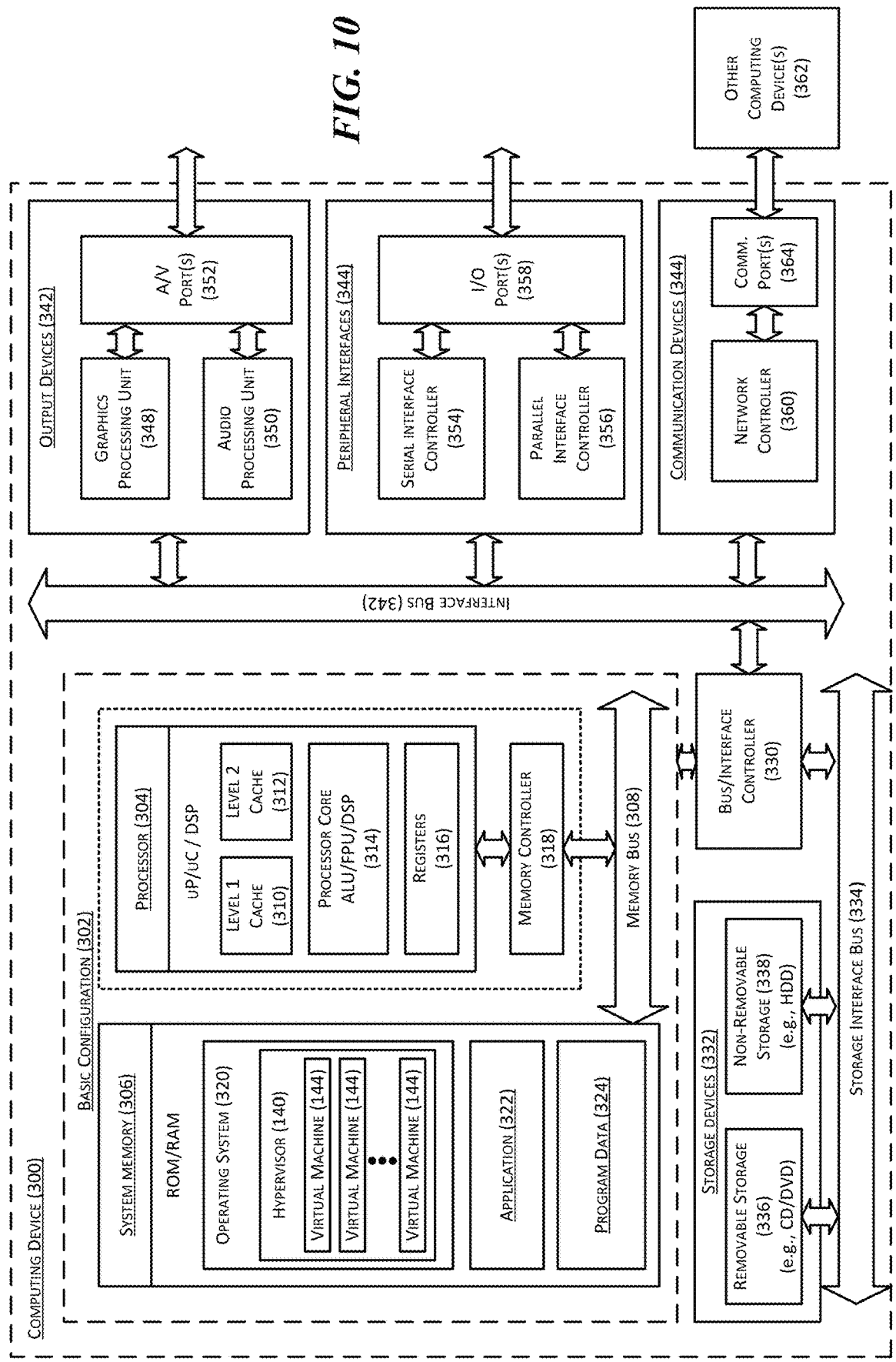
FIG. 10 is a computing device suitable for certain components of the computing system in FIG. 1.

FIG. 10 is a computing device 300 suitable for certain components of the computing system 100 in FIG. 1. For example, the computing device 300 can be suitable for the hosts 106 or the cloud controller 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more AN ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a computing device in a computing system having a plurality of servers interconnected by a computer network, comprising:
   receiving, via the computer network, a user request from a user to instantiate a virtual machine configured to perform a task; and
   in response to the received request from the user,
      determining whether the task to be performed by the requested virtual machine is user-facing, wherein the task is user-facing when the task is configured to receive a user input from the user, process the received user input to derive an output, and provide the derived output to the user via the computer network in response to the received user input; and
      in response to determining that the task is user-facing, allocating the requested virtual machine to a server in the computing system, the server having computing resources not oversubscribed by additional virtual machines, thereby preventing the user from experiencing service delays or interruptions due to oversubscription of resources during execution of the task by the allocated virtual machine.

2. The method of claim 1, further comprising in response to determining that the task is not user-facing, selecting another server that is oversubscribed in the computing system to instantiate the requested virtual machine.

3. The method of claim 1 wherein determining whether the task to be performed by the requested virtual machine is user-facing includes determining whether the task to be performed by the requested virtual machine is user-facing based on historical utilization data of other virtual machines configured to perform the same requested task.

4. The method of claim 1 wherein determining whether the task to be performed by the requested virtual machine is user-facing includes determining whether the task to be performed by the requested virtual machine is user-facing based on a frequency spectrum of historical utilization data of virtual machines configured to perform the same requested task.

5. The method of claim 1 wherein determining whether the task to be performed by the requested virtual machine is user-facing includes:
   determining whether a frequency spectrum of historical utilization data of virtual machines configured to perform the same requested task shows distinct spectral peaks at one or more frequencies; and
   in response to determining that the frequency spectrum shows distinct spectral peaks at one or more frequencies, indicating that the requested task is user-facing.

6. The method of claim 1 wherein determining whether the task to be performed by the requested virtual machine is user-facing includes:
   determining whether a frequency spectrum of historical utilization data of virtual machines configured to perform the same requested task shows spectral values that are less than a preset threshold for all frequencies; and
   in response to determining that the frequency spectrum shows spectral values that are less than a preset threshold for all frequencies, indicating that the requested task is not user-facing.

7. The method of claim 1 wherein determining whether the task to be performed by the requested virtual machine is user-facing includes:
   determining whether a frequency spectrum of historical utilization data of virtual machines configured to perform the same requested task shows highest spectral values for frequencies less than a frequency threshold; and
   in response to determining that the frequency spectrum shows highest spectral values for frequencies less than a frequency threshold, indicating that the requested task is not user-facing.

8. The method of claim 1 wherein determining whether the task to be performed by the requested virtual machine is user-facing includes:
   determining whether a frequency spectrum of historical utilization data of virtual machines configured to perform the same requested task shows a highest spectral value at zero frequency; and
   in response to determining that the frequency spectrum shows a highest spectral value at zero frequency, indicating that the requested task is not user-facing.

9. A computing device in a computing system having a plurality of servers interconnected by a computer network, the computing device comprising:
   a processor; and
   a memory operatively coupled to the processor, the memory containing instructions executable by the processor to cause the processor to perform a process comprising:
      receiving, via the computer network, resource utilization data of a virtual machine hosted on a server in the computing system to perform a task; and
      analyzing the received resource utilization data of the virtual machine to determine whether the task performed by the virtual machine is user-facing, including:
         deriving a temporal pattern of resource utilization based on the received resource utilization data;
         determining whether the derived temporal pattern indicates one or more cycles of resource utilization as a function of time; and
         in response to determining that the derived pattern indicates one or more cycles of resource utilization as a function of time, indicating that the task performed by the virtual machine is user-facing and relocating the virtual machine to another server that is not oversubscribed when the current server is oversubscribed.

10. The computing device of claim 9 wherein deriving a temporal pattern of resource utilization includes plotting the received resource utilization data as a function of time.

11. The computing device of claim 9 wherein:
deriving a temporal pattern of resource utilization includes:
plotting the received resource utilization data as a function of time; and
applying Fast Fourier Transform on the plotted resource utilization data to derive a spectrum in a frequency domain; and
determining whether the derived temporal pattern indicates one or more cycles includes determining whether the derived spectrum includes one or more distinct spectral values greater than a spectral threshold at one or more frequencies and in response to determining that the derived spectrum includes one or more distinct spectral values greater than a spectral threshold at one or more frequencies, indicating that the derived temporal pattern indicates one or more cycles of resource utilization as a function of time.

12. The computing device of claim 9 wherein:
deriving a temporal pattern of resource utilization includes:
plotting the received resource utilization data as a function of time; and
applying Fast Fourier Transform on the plotted resource utilization data to derive a spectrum in a frequency domain; and
determining whether the derived temporal pattern indicates one or more cycles includes determining whether the derived spectrum includes one or more distinct spectral values greater than a spectral threshold at one or more frequencies between 31 to 93 cycles per month and in response to determining that the derived spectrum includes one or more distinct spectral values greater than a spectral threshold at one or more frequencies between 31 to 93 cycles per month, indicating that the derived temporal pattern indicates one or more cycles of resource utilization as a function of time.

13. The computing device of claim 9 wherein:
deriving a temporal pattern of resource utilization includes:
plotting the received resource utilization data as a function of time; and
deriving a spectrum in a frequency domain based on the plotted resource utilization; and
determining whether the derived temporal pattern indicates one or more cycles includes determining whether the derived spectrum includes spectral values that are less than a preset threshold for all frequencies and in response to determining that the derived spectrum includes spectral values that are less than a preset threshold for all frequencies, indicating that the derived temporal pattern does not indicate one or more cycles of resource utilization as a function of time.

14. The computing device of claim 9 wherein:
deriving a temporal pattern of resource utilization includes:
plotting the received resource utilization data as a function of time; and
deriving a spectrum in a frequency domain based on the plotted resource utilization; and
determining whether the derived temporal pattern indicates one or more cycles includes determining whether the derived spectrum includes highest spectral values for frequencies less than a frequency threshold of about 0 to 200 cycles per month and in response to determining that the derived spectrum includes the derived spectrum includes highest spectral values for frequencies less than a frequency threshold of about 0 to 200 cycles per month, indicating that the derived temporal pattern does not indicate one or more cycles of resource utilization as a function of time.

15. The computing device of claim 9 wherein the process performed by the processor further includes:
in response to determining that the derived pattern does not indicate one or more cycles of resource utilization as a function of time,
indicating that the task performed by the virtual machine is not user-facing; and
relocating the virtual machine to another server that is oversubscribed when the current server is not oversubscribed.

16. A method performed by a computing device in a computing system having a plurality of servers interconnected by a computer network, comprising:
receiving, via the computer network, resource utilization data of a virtual machine hosted on a server in the computing system, the virtual machine being configured to perform a task;
determining whether a temporal pattern of the resource utilization data associated with the virtual machine indicates one or more cycles of utilization as a function of time indicating that the task performed by the virtual machine is user-facing; and
in response to determining that the temporal pattern associated with the virtual machine indicates one or more cycles of resource utilization as a function of time,
determining whether the server currently hosting the virtual machine is oversubscribed by virtual machines; and
in response to determining that the server currently hosting the virtual machine is oversubscribed by virtual machines, causing the virtual machine to migrate to another server in the computing system, the another server is not oversubscribed by virtual machines.

17. The method of claim 16 wherein determining whether a temporal pattern of the resource utilization data associated with the virtual machine indicates one or more cycles includes:
performing at least one of a Laplace Transform, a Fourier Transform, or a Fast Fourier Transform on the received resource utilization data; and
determining whether the transformed resource utilization data includes one or more distinct spectral values greater than a spectral threshold at one or more frequencies.

18. The method of claim 16 wherein determining whether a temporal pattern of the resource utilization data associated with the virtual machine indicates one or more cycles includes:
performing at least one of a Laplace Transform, a Fourier Transform, or a Fast Fourier Transform on the received resource utilization data; and determining whether the transformed resource utilization data includes spectral values that are less than a preset threshold for all frequencies.

19. The method of claim 16 wherein determining whether a temporal pattern of the resource utilization data associated with the virtual machine indicates one or more cycles includes:

performing at least one of a Laplace Transform, a Fourier Transform, or a Fast Fourier Transform on the received resource utilization data; and determining whether the transformed resource utilization data includes highest spectral values for frequencies less than a frequency threshold of about 0 to 200 cycles per month.

20. The method of claim 16, further comprising:

in response to determining that the temporal pattern associated with the virtual machine does not indicate one or more cycles of resource utilization as a function of time, determining whether the server currently hosting the virtual machine is oversubscribed by virtual machines; and in response to determining that the server currently hosting the virtual machine is not oversubscribed by virtual machines, causing the virtual machine to migrate to another server in the computing system, the another server is oversubscribed by virtual machines.

\* \* \* \* \*